United States Patent
Davenport et al.

(10) Patent No.: US 9,992,988 B2
(45) Date of Patent: Jun. 12, 2018

(54) FISH ATTRACTING ASSEMBLY

(71) Applicants: David Davenport, Eau Claire, WI (US); Bill McMullin, Eau Claire, WI (US)

(72) Inventors: David Davenport, Eau Claire, WI (US); Bill McMullin, Eau Claire, WI (US)

( * ) Notice: Subject to any disclaimer, the term of this patent is extended or adjusted under 35 U.S.C. 154(b) by 168 days.

(21) Appl. No.: 15/049,142

(22) Filed: Feb. 21, 2016

(65) Prior Publication Data

US 2017/0238518 A1     Aug. 24, 2017

(51) Int. Cl.
```
A01K 61/00    (2017.01)
A01K 97/01    (2006.01)
A01K 97/00    (2006.01)
A01K 99/00    (2006.01)
G03B 17/08    (2006.01)
A01K 61/70    (2017.01)
G03B 15/03    (2006.01)
G03B 29/00    (2006.01)
```

(52) U.S. Cl.
CPC .............. *A01K 97/01* (2013.01); *A01K 61/70* (2017.01); *A01K 97/00* (2013.01); *A01K 99/00* (2013.01); *G03B 15/03* (2013.01); *G03B 17/08* (2013.01); *G03B 29/00* (2013.01)

(58) Field of Classification Search
CPC ........ A01K 61/70; A01K 61/72; A01K 61/75; A01K 97/00; A01K 97/01; A01K 99/00
USPC ...................... 43/4, 17.5, 17.6; 119/221, 222
See application file for complete search history.

(56) References Cited

U.S. PATENT DOCUMENTS

| | | | | |
|---|---|---|---|---|
| 3,079,721 A | * | 3/1963 | Smith | A01K 85/01 43/17.5 |
| 3,091,882 A | * | 6/1963 | Dudley | A01K 97/04 43/17.5 |
| 3,177,604 A | * | 4/1965 | Ewing | A01K 85/01 43/17.5 |
| 4,475,301 A | * | 10/1984 | Wortham | A01K 97/04 43/17.5 |
| 4,727,672 A | * | 3/1988 | Hill | A41G 1/00 428/17 |
| 4,916,845 A | * | 4/1990 | Aydelette, Sr. | A01K 97/02 43/4 |
| 5,005,309 A | * | 4/1991 | Hall | A01K 61/70 43/4 |
| 5,042,424 A | * | 8/1991 | Hense | A01K 61/70 119/221 |
| 5,201,136 A | * | 4/1993 | LaMorte | A01K 61/70 119/221 |
| 5,272,829 A | * | 12/1993 | Roberts | A01K 61/70 119/51.04 |
| 5,315,779 A | * | 5/1994 | Fussell | A01K 61/70 43/4 |

(Continued)

*Primary Examiner* — Darren W Ark

(57) ABSTRACT

A fish attracting assembly includes a tree that is positionable between a collapsed position and a deployed position. The tree is may be inserted through an ice fishing hole when the tree is positioned in the collapsed position. The tree is substantially comprised of a buoyant material. Thus, the tree is positioned in the deployed position when the tree is inserted through the ice fishing hole. A camera is coupled to the tree and the camera captures images below the ice fishing hole. A light emitter is coupled to the tree and the light emitter emits light below the ice fishing hole.

5 Claims, 5 Drawing Sheets

(56) References Cited

U.S. PATENT DOCUMENTS

| | | | | |
|---|---|---|---|---|
| 6,269,582 B1* | 8/2001 | Feld | A01K 61/70 | |
| | | | 119/233 | |
| 6,909,845 B1* | 6/2005 | Schillinger | G03B 17/08 | |
| | | | 348/81 | |
| 6,978,735 B1* | 12/2005 | Yeager | A01K 61/70 | |
| | | | 119/221 | |
| 7,104,219 B2* | 9/2006 | Frantz | E02B 3/046 | |
| | | | 119/207 | |
| 7,512,326 B1* | 3/2009 | Eldredge | G03B 17/08 | |
| | | | 396/25 | |
| D607,082 S* | 12/2009 | Harper | D22/199 | |
| D625,471 S* | 10/2010 | King | D30/106 | |
| 7,828,493 B1* | 11/2010 | Brignac | A01K 61/70 | |
| | | | 119/221 | |
| 8,120,650 B2* | 2/2012 | Laser | A01K 97/00 | |
| | | | 43/4 | |
| 8,640,651 B2* | 2/2014 | Ewald | A01K 61/70 | |
| | | | 119/221 | |
| D717,501 S* | 11/2014 | King | D30/106 | |
| 8,919,034 B2* | 12/2014 | Alhuwaishel | A01K 69/06 | |
| | | | 43/100 | |
| D757,369 S* | 5/2016 | Marsden | D30/106 | |
| 9,560,838 B1* | 2/2017 | King | A01K 61/006 | |
| 9,681,645 B2* | 6/2017 | Marsden | A01K 61/70 | |
| 9,749,507 B1* | 8/2017 | Sandstrom | A01K 97/00 | |
| 2005/0229863 A1* | 10/2005 | Harper | A01K 61/70 | |
| | | | 119/221 | |
| 2012/0279109 A1* | 11/2012 | Nichol | A01K 97/01 | |
| | | | 43/4.5 | |
| 2013/0047489 A1* | 2/2013 | Walker | A01K 97/01 | |
| | | | 43/4.5 | |
| 2014/0158061 A1* | 6/2014 | Beasley | A01K 61/006 | |
| | | | 119/221 | |

* cited by examiner

FISH ATTRACTING ASSEMBLY

BACKGROUND OF THE DISCLOSURE

Field of the Disclosure

The disclosure relates to attracting devices and more particularly pertains to a new attracting device for attracting fish during ice fishing.

SUMMARY OF THE DISCLOSURE

An embodiment of the disclosure meets the needs presented above by generally comprising a tree that is positionable between a collapsed position and a deployed position. The tree may be inserted through an ice fishing hole when the tree is positioned in the collapsed position. The tree is substantially comprised of a buoyant material. Thus, the tree is positioned in the deployed position when the tree is inserted through the ice fishing hole. A camera is coupled to the tree and the camera captures images below the ice fishing hole. A light emitter is coupled to the tree and the light emitter emits light below the ice fishing hole.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
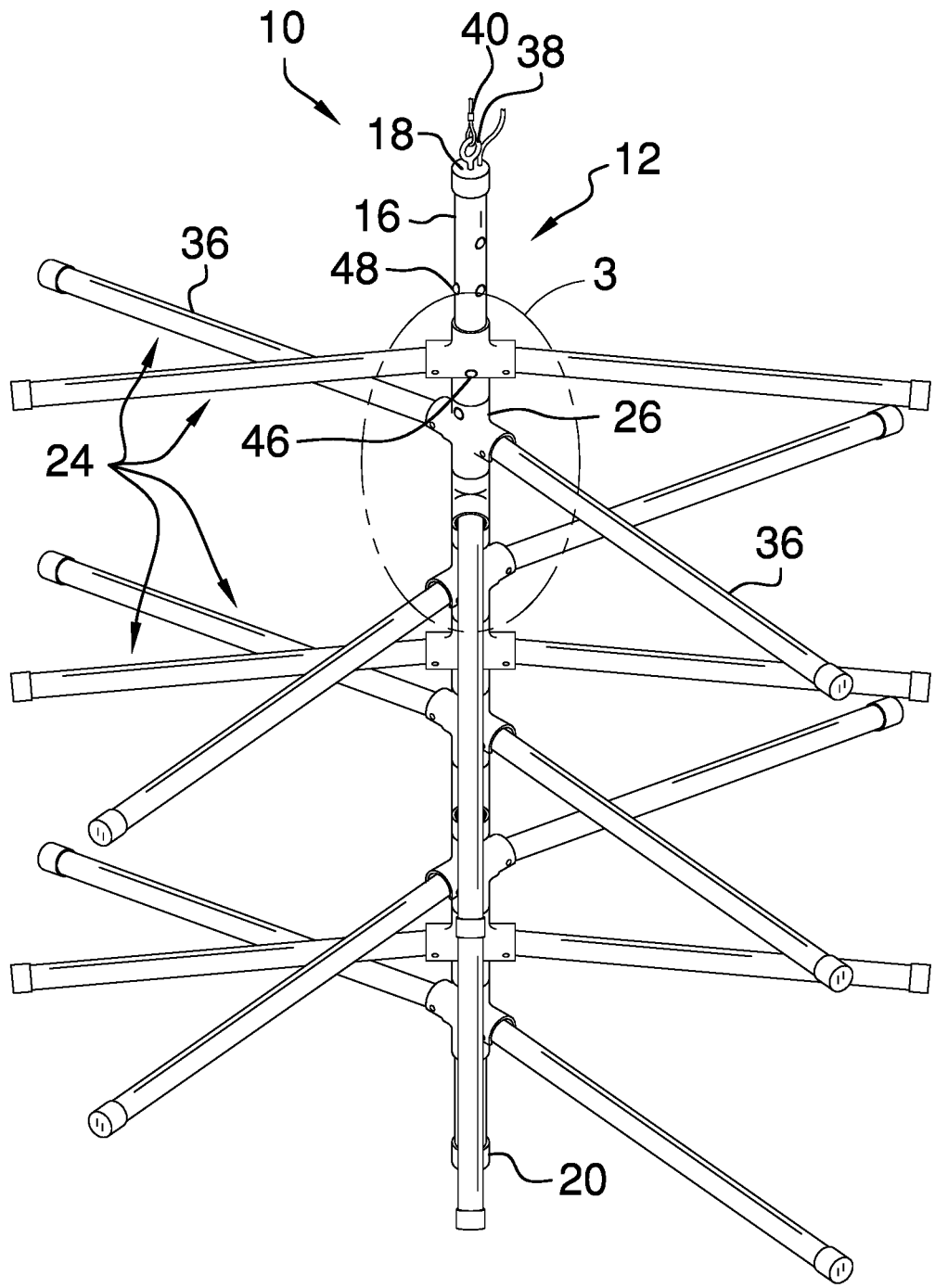
FIG. 1 is a perspective view of a fish attracting assembly according to an embodiment of the disclosure.
Figure 2:
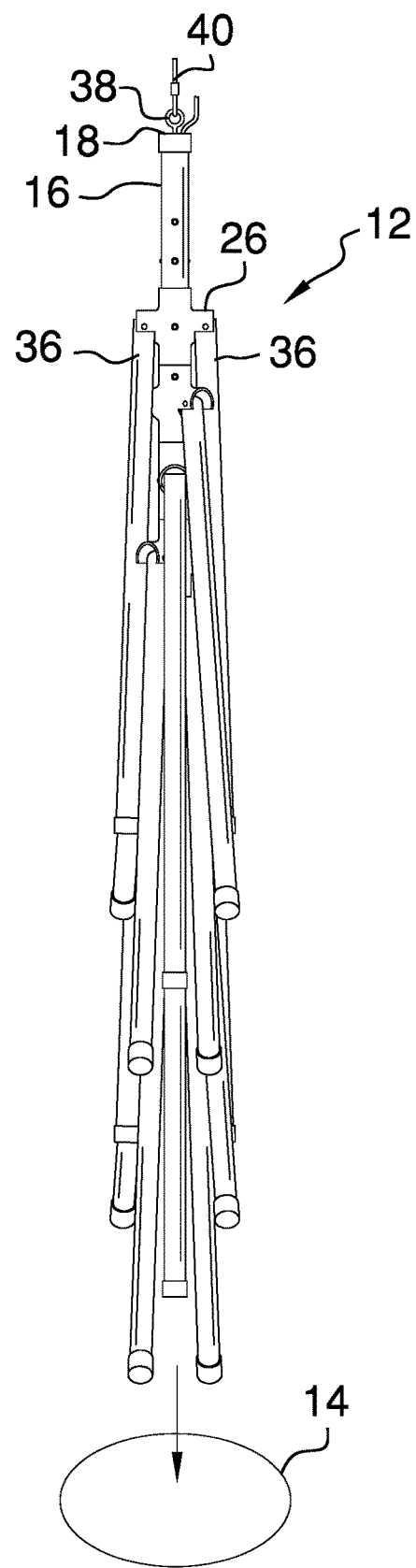
FIG. 2 is a perspective view of an embodiment of the disclosure in a collapsed position.
Figure 3:
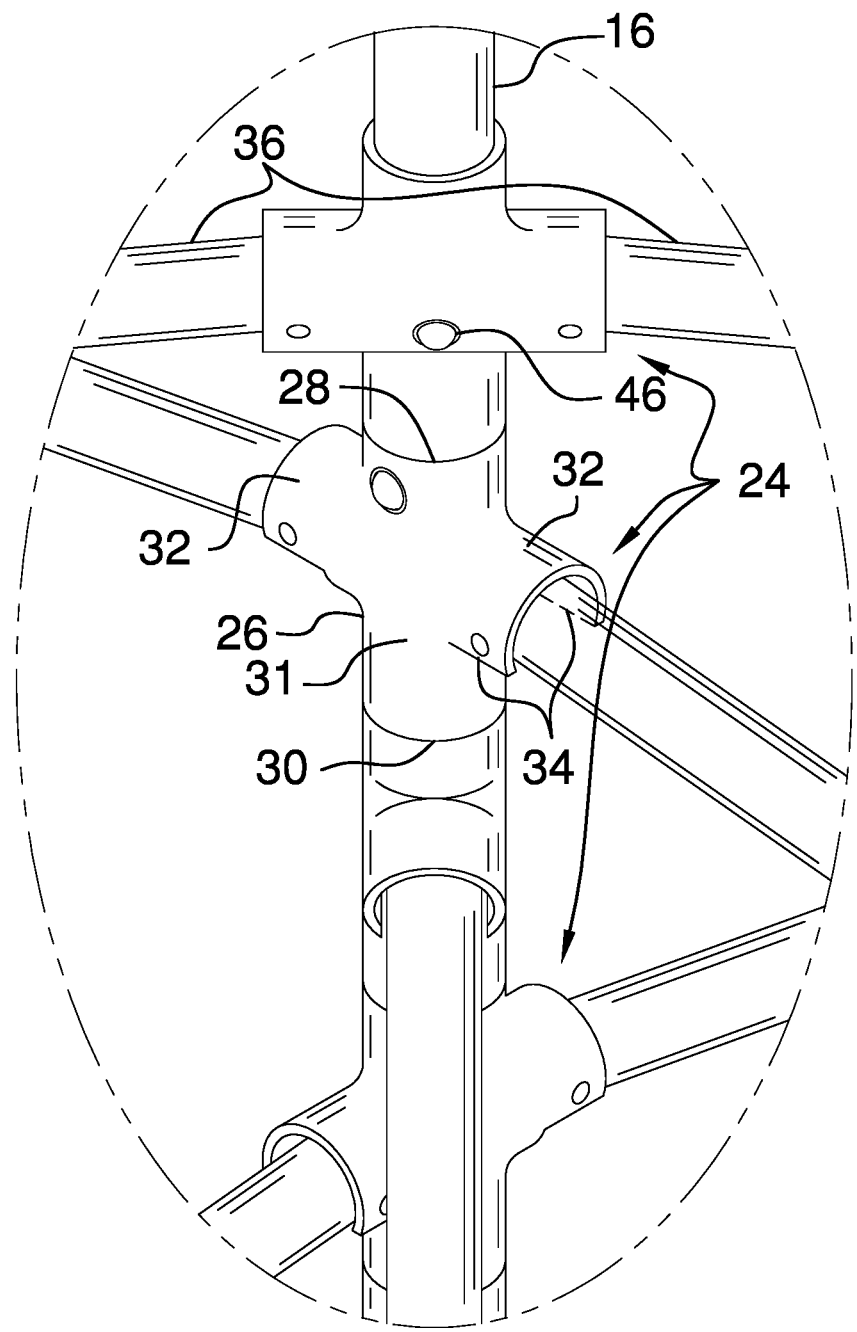
FIG. 3 is a front perspective view of an embodiment of the disclosure.

With reference now to the drawings, and in particular to FIGS. 1 through 5 thereof, a new attracting device embodying the principles and concepts of an embodiment of the disclosure and generally designated by the reference numeral 10 will be described.

As best illustrated in FIGS. 1 through 5, the fish attracting assembly 10 generally comprises a tree 12 that is positionable between a collapsed position and a deployed position. The tree 12 may be inserted through an ice fishing hole 14 when the tree 12 is positioned in the collapsed position. The tree 12 is substantially comprised of a buoyant material. Thus, the tree 12 is positioned in the deployed position when the tree 12 is inserted through the ice fishing hole 14. The tree 12 provides structure for fish when the tree 12 is inserted through the ice fishing hole 14.

The tree 12 comprises a central rod 16 that has a first end 18 and a second end 20. The central rod 16 is filled with a weighted material 22. Thus, the tree 12 sinks when the tree 12 is inserted through the ice fishing hole 14. The weighted material 22 may comprise sand or the like.

A plurality of movable members 24 is provided. Each of the movable members 24 is coupled to the central rod 16. The movable members 24 are spaced apart from each other and distributed along the central rod 16. The movable members 24 are staggered about an axis extending between the first end 18 and the second end 20. Each of the movable members 24 comprises a coupler 26 that has a top end 28, a bottom end 30 and an outer wall 31 extending between the top end 28 and the bottom end 30. The top end 28 and the bottom end 30 are open and the coupler 26 is substantially hollow.

The outer wall 31 is continuous such that the coupler 26 has a cylindrical shape. The central rod 16 extends through the top end 28 and the bottom end 30 of the coupler 26. The coupler 26 includes a pair of troughs 32. Each of the troughs 32 extends outwardly from the outer wall 31 of the coupler 26. Each of the troughs 32 is oriented perpendicular to an axis extending through the top end 28 and the bottom end 30. Each of the troughs 32 has a pair of lateral edges 34. The lateral edges 34 corresponding to each of the troughs 32 is directed downwardly toward the second end 20 of the central rod 16.

A pair of lateral rods 36 is provided. Each of the lateral rods 36 is hingedly coupled to an associated one of the troughs 32. Each of the lateral rods 36 is positionable in a collapsed position having the lateral rods 36 extending downwardly along the central rod 16. The tree 12 has a maximum diameter of twenty cm when the lateral rods 36 are in the collapsed position. Thus, the tree 12 fits through a corresponding eight inch ice fishing hole 14.

Each of the lateral rods 36 extends laterally away from the central rod 16 when the lateral rods 36 are positioned in a deployed position. Each of the lateral rods 36 is comprised of the buoyant material. Thus, each of the lateral rods 36 is positioned is the deployed position when the tree 12 is inserted into the ice fishing hole 14. Each of the lateral rods 36 abuts the outer wall 31 of the associated trough 32 when the lateral rods 36 are positioned in the deployed position. Thus, the lateral rods 36 are oriented perpendicular to the central rod 16.

A hook 38 is coupled to the tree 12. The hook 38 extends upwardly from the first end 18 of the central rod 16. A rope 40 is coupled to the hook 38. The rope 40 may be manipulated thereby facilitating the tree 12 to be retrieved from the ice fishing hole 14.

A wire 42 is coupled to the tree 12 and the wire 42 extends upwardly from the first end 18 of the central rod 16. The wire 42 may comprise an insulated conductor or the like. The wire 42 may be electrically coupled to an extrinsic electrical device 44. The extrinsic electrical device 44 may comprise a monitor for an underwater camera or the like.

A camera 46 is coupled to the tree 12 and the camera 46 captures images below the ice fishing hole 14. The camera 46 is positioned on the coupler 26 corresponding to one of the movable members 24. The camera 46 is electrically coupled to the wire 42. The camera 46 may comprise a water proof digital camera or the like.

A light emitter 48 is coupled to the tree 12 and the light emitter 48 emits light below the ice fishing hole 14. The light emitter 48 is positioned on the coupler 26 corresponding to one of the movable members 24. The light emitter 48 is electrically coupled to the wire 42. The light emitter 48 may comprise a water proof LED or the like.

Figure 4:
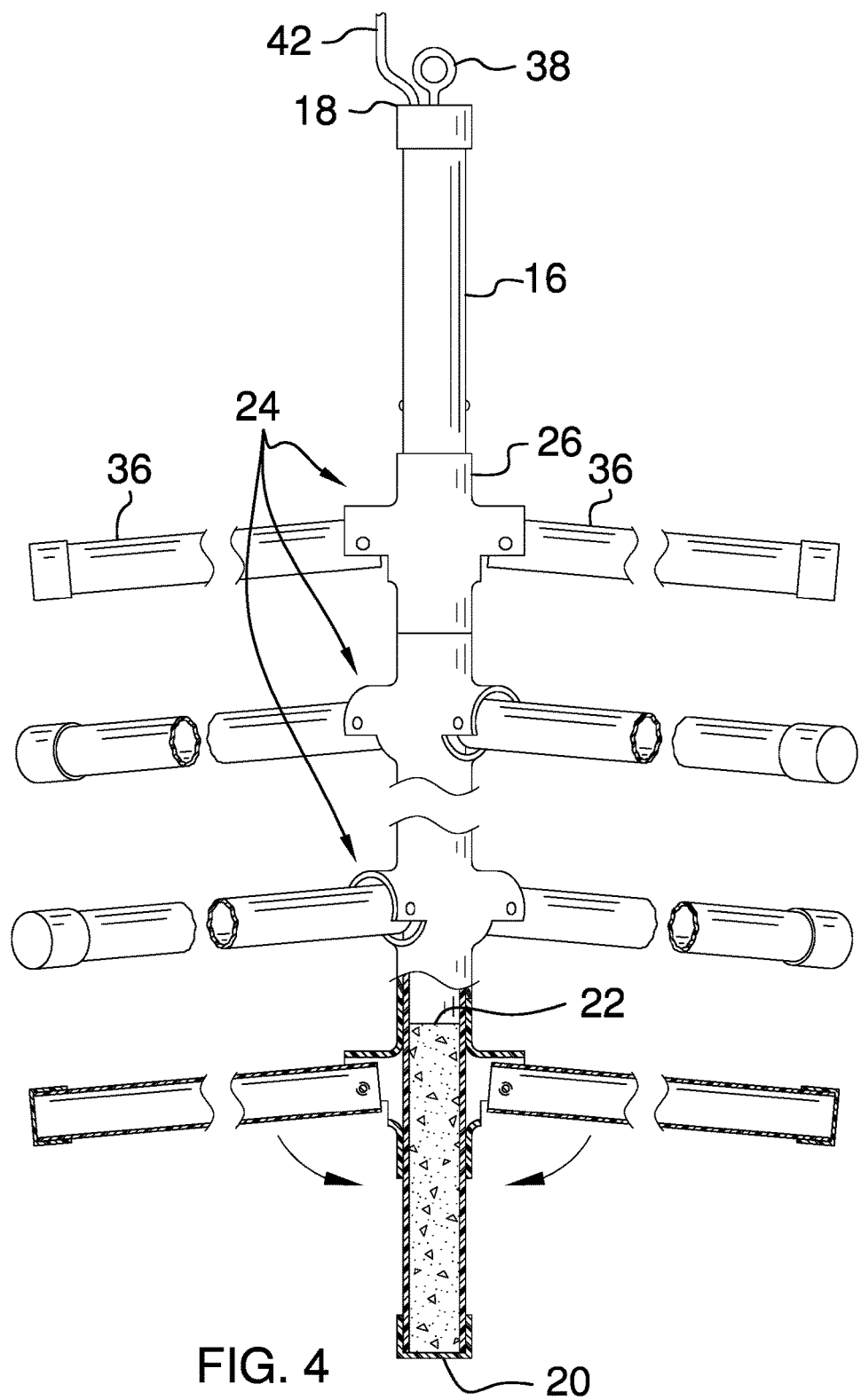
FIG. 4 is a front cut-away view of an embodiment of the disclosure.
Figure 5:
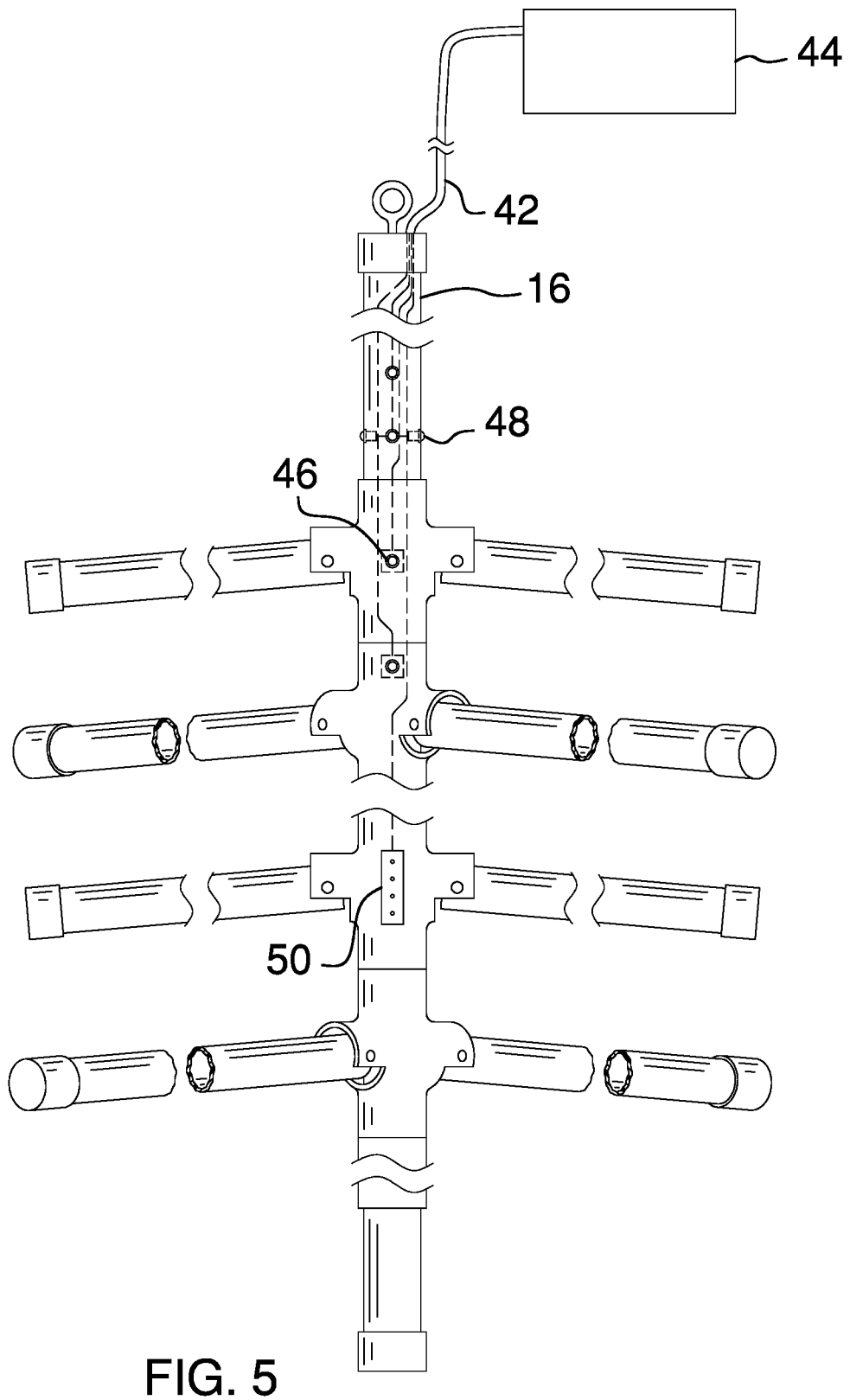
FIG. 5 is a perspective view of an alternative embodiment of the disclosure.

In an alternative embodiment as shown in FIG. 4, a scent emitter 50 may be coupled to the tree. The scent emitter 50 may emit a scent thereby facilitating the tree 12 to attract the fish. The scent may be a scent of bait fish or the like. The scent emitter 50 may positioned on the central rod 16 and the scent emitter 50 may be electrically coupled to the wire 42. The scent emitter 50 may comprise an electric scent dispenser that releases a liquid scent or the like.

In use, the wire 42 is electrically coupled to the extrinsic electronic device 44. The rope 40 is gripped and the tree 12 is lowered through the ice fishing hole 14. The central rod 16 sinks and the lateral rods 36 float into the deployed position. The tree 12 sinks to a selected depth. The tree 12 facilitates a fish attracting structure to be positioned proximate the ice fishing hole 14. The extrinsic electronic device 44 is manipulated to display the images capture by the camera 46. The scent emitter 50 emits the scent to attract the fish.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A fish attracting assembly comprising:
a tree being positionable between a collapsed position and a deployed position, said tree being configured to be inserted through an ice fishing hole when said tree is positioned in said collapsed position, said tree being substantially comprised of a buoyant material wherein said tree is configured to be positioned in said deployed position when said tree is inserted through the ice fishing hole thereby facilitating said tree to provide structure for fish, said tree including a central rod having a first end and a second end, said central rod being filled with a weighted material wherein said tree is configured to sink when said tree is inserted through the ice fishing hole;
a camera being coupled to said tree wherein said camera is configured to capture images below the ice fishing hole;
a light emitter being coupled to said tree wherein said light emitter is configured to emit light below the ice fishing hole;
a plurality of movable members, each of said movable members being coupled to said central rod, said movable members being spaced apart from each other and being distributed along said central rod, each of said movable members including a coupler having a top end, a bottom end and an outer wall extending between said top end and said bottom end, said top end and said bottom end being open, said coupler being substantially hollow, said outer wall being continuous such that said coupler has a cylindrical shape, said central rod extending through said top end and said bottom end of said coupler; and
said coupler has a pair of troughs, each of said troughs extending outwardly from said outer wall of said coupler, each of said troughs being oriented perpendicular to an axis extending through said top end and said bottom end, each of said troughs having a pair of lateral edges, said lateral edges corresponding to each of said troughs being directed downwardly toward said second end of said central rod.

2. The assembly according to claim 1, wherein each of said movable members further comprises a pair of lateral rods, each of said lateral rods being hingedly coupled to an associated one of said troughs, each of said lateral rods being positionable in said collapsed position having said lateral rods extending downwardly along said central rod.

3. The assembly according to claim 2, wherein each of said lateral rods is comprised of said buoyant material such that each of said lateral rods is positioned in said deployed position having said lateral rods extending laterally away from said central rod when said tree is inserted into the ice fishing hole, each of said lateral rods abutting said outer wall of said associated one of said troughs when said lateral rods are positioned in said deployed position such that said lateral rods are oriented perpendicular to said central rod.

4. The assembly according to claim 1, further comprising:
a hook being coupled to said tree, said hook extending upwardly from said first end of said central rod; and
a rope being coupled to said hook wherein said rope is configured to be manipulated thereby facilitating said tree to be retrieved from the ice fishing hole.

5. A fish attracting assembly comprising:
a tree being positionable between a collapsed position and a deployed position, said tree being configured to be inserted through an ice fishing hole when said tree is positioned in said collapsed position, said tree being substantially comprised of a buoyant material wherein said tree is configured to be positioned in said deployed position when said tree is inserted through the ice fishing hole thereby facilitating said tree to provide structure for fish, said tree comprising:
a central rod having a first end and a second end, said central rod being filled with a weighted material wherein said tree is configured to sink when said tree is inserted through the ice fishing hole, a plurality of movable members, each of said movable members being coupled to said central rod, said movable members being spaced apart from each other and being distributed along said central rod, each of said movable members comprising:
a coupler having a top end, a bottom end and an outer wall extending between said top end and said bottom end, said top end and said bottom end being open, said coupler being substantially hollow, said outer wall being continuous such that said coupler has a cylindrical shape, said central rod extending through said top end and said bottom end of said coupler, said coupler having a pair of troughs, each of said troughs extending outwardly from said outer wall of said coupler, each of said troughs being oriented perpendicular to an axis extending through said top end and said bottom end, each of said troughs having a pair of lateral edges, said lateral edges corresponding to each of said troughs being directed downwardly toward said second end of said central rod, and a pair of lateral rods, each of said lateral rods being hingedly coupled to an associated one of said troughs, each of said lateral rods being positionable in said collapsed position having said lateral rods extending downwardly along said central rod, each of said lateral rods being comprised of said buoyant material such that each of said lateral rods is positioned is said deployed position having said lateral rods extending laterally away from said central rod when said tree is inserted into the ice fishing hole, each of said lateral rods abutting said outer wall of said associated trough when said lateral rods are positioned in said deployed position such that said lateral rods are oriented perpendicular to said central rod;

a hook being coupled to said tree, said hook extending upwardly from said first end of said central rod;

a rope being coupled to said hook wherein said rope is configured to be manipulated thereby facilitating said tree to be retrieved from the ice fishing hole;

a wire being coupled to said tree, said wire extending upwardly from said first end of said central rod, said wire being configured to be electrically coupled to an extrinsic electrical device;

a camera being coupled to said tree wherein said camera is configured to capture images below the ice fishing hole, said camera being positioned on said coupler corresponding to one of said movable members, said camera being electrically coupled to said wire; and a light emitter being coupled to said tree wherein said light emitter is configured to emit light below the ice fishing hole, said light emitter being positioned on said coupler corresponding to one of said movable members, said light emitter being electrically coupled to said wire.

* * * * *